Jan. 18, 1927.　　　　　　　　　　　　　　　　　　　　　1,615,088
P. KLIEBER
WOOD SHAPING MACHINE
Filed Jan. 2, 1925　　　3 Sheets-Sheet 1
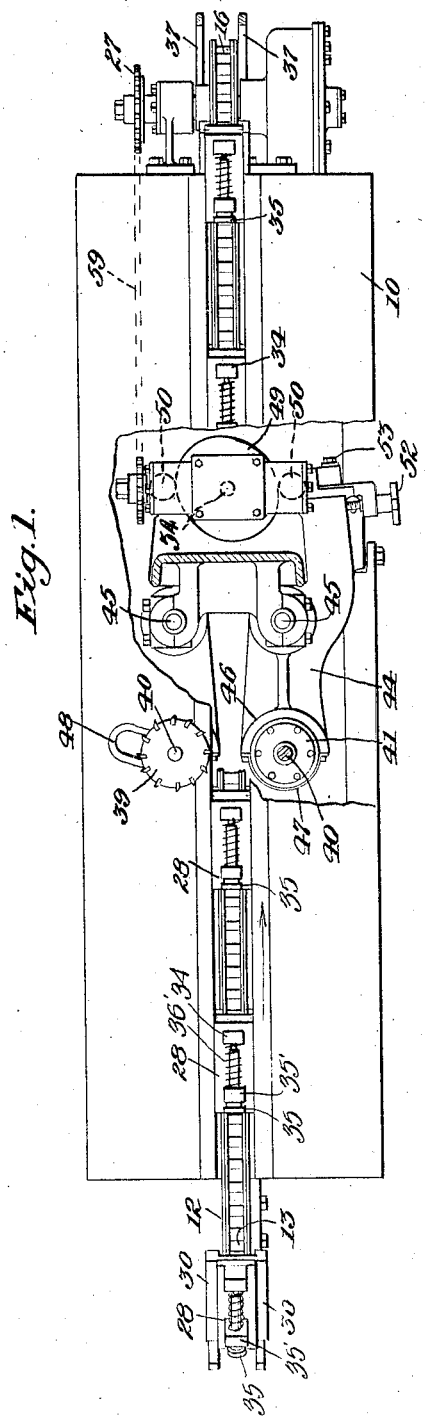
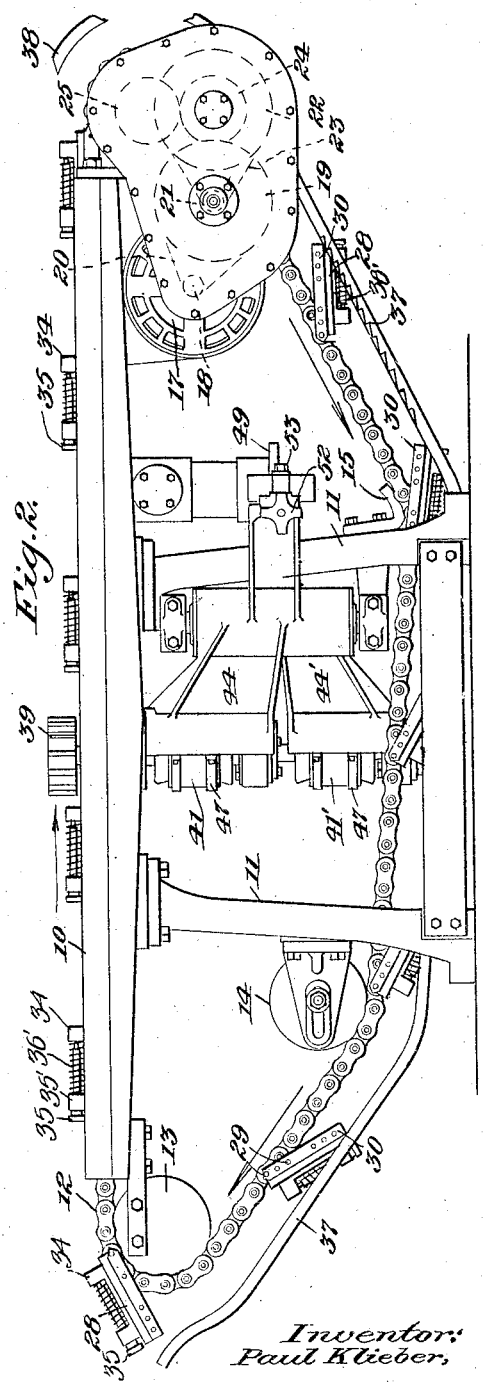
Inventor:
Paul Klieber,

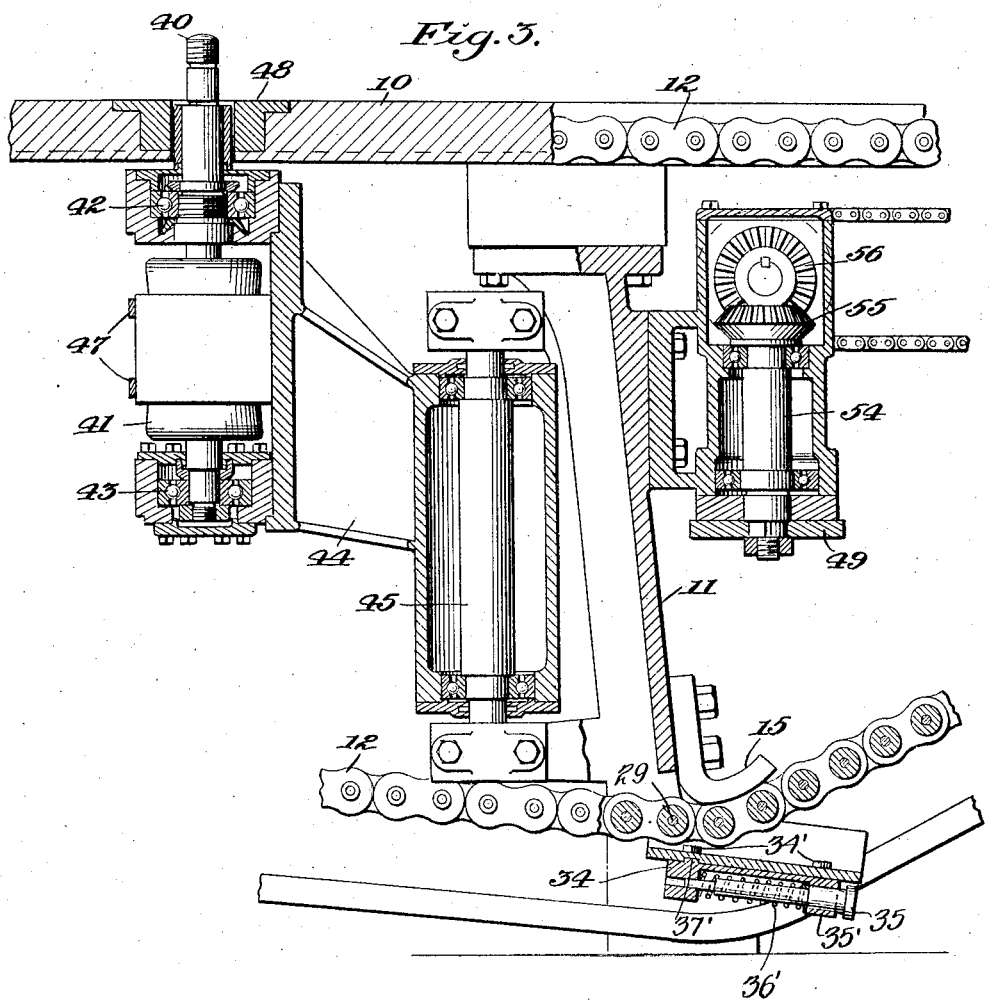

Jan. 18, 1927.
P. KLIEBER
1,615,088
WOOD SHAPING MACHINE
Filed Jan. 2, 1925  3 Sheets-Sheet 3
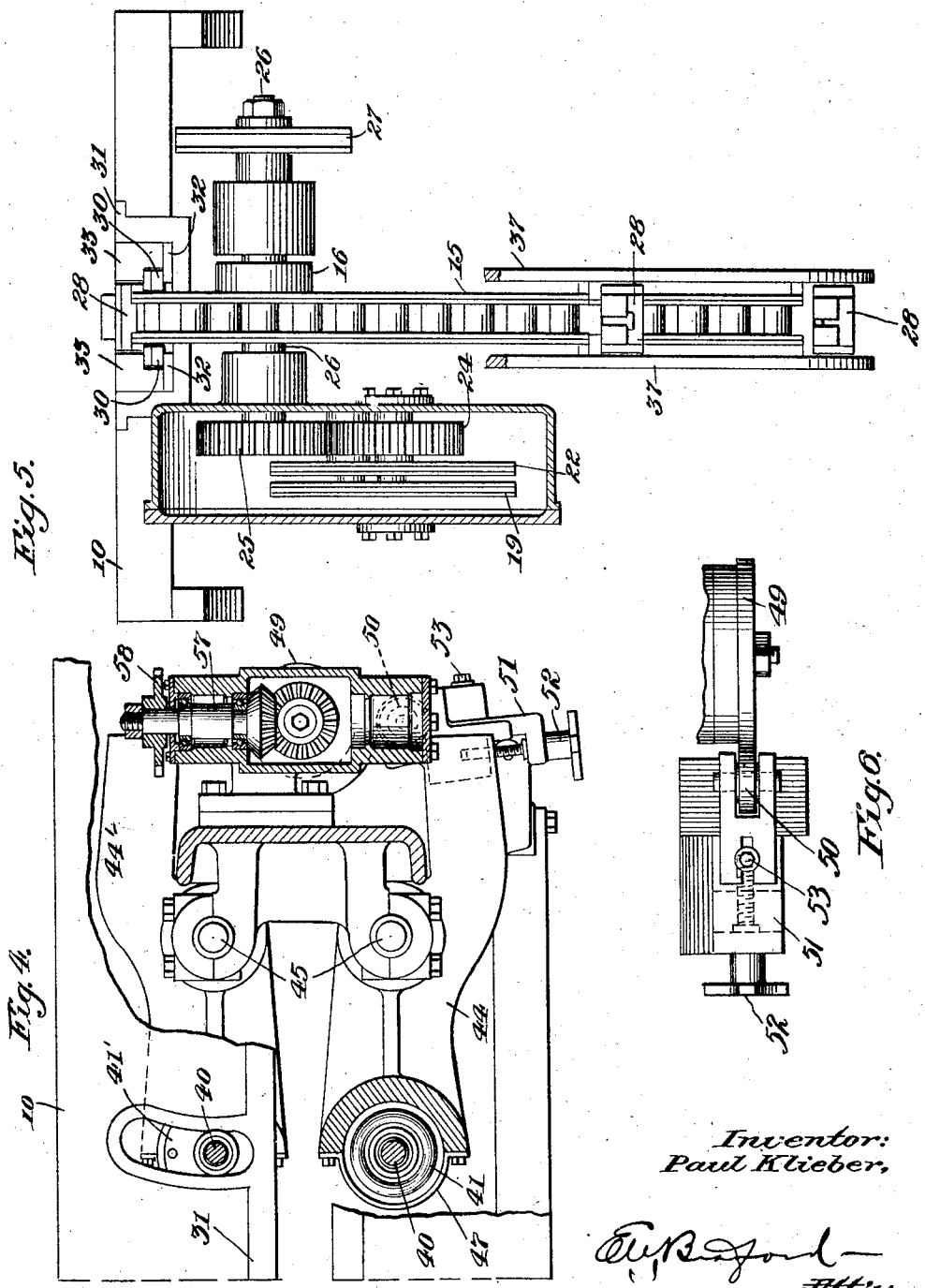
Inventor:
Paul Klieber,
Att'y.

Patented Jan. 18, 1927.

1,615,088

UNITED STATES PATENT OFFICE.

PAUL KLIEBER, OF INDIANAPOLIS, INDIANA, ASSIGNOR TO THE KLIEBER-DAWSON MACHINE COMPANY, OF INDIANAPOLIS, INDIANA, A CORPORATION OF INDIANA.

WOOD-SHAPING MACHINE.

Application filed January 2, 1925. Serial No. 252.

My said invention relates to a shaping machine designed primarily for shaping wood, but also adapted for shaping a variety of other materials, and it is an object of the same to provide a device of this character by means of which hand labor shall be largely eliminated and production shall be greatly increased.

Referring to the accompanying drawings which are made a part hereof and on which similar reference characters indicate similar parts, Figure 1 is a plan of my invention, Figure 2, a side elevation thereof, Figure 3, a fragmentary vertical section on an enlarged scale, Figure 4, a fragmentary horizontal section on a plane below the top of the table in Figure 2, Figure 5, an end view looking from the right in Figure 2, and Figure 6, a detail of a follower and its mounting.

In the drawings reference character 10 indicates a table which has a longitudinal slot intermediate its sides, said table being supported in any convenient manner as by means of legs 11. A chain 12 slides in the slot on the table and is guided in an endless path by means of guides such as are indicated at 13, 14 and 15.

The chain 12 is a sprocket chain and is driven at the rear end of the machine by a sprocket 16. For driving the sprocket I have provided a train of mechanism comprising a motor 17 driving a sprocket gear 18 which in turn drives a pulley 19 by means of a chain 20. The pulley 19 is mounted on a shaft carrying a gear 21 connected to drive a sprocket gear 22 by means of a chain 23. The gear 22 is fixed to a shaft on which is mounted a gear 24 having teeth meshing with those of a gear 25 on a shaft 26. The shaft 26 has secured thereto the sprocket 16 and another sprocket gear 27.

The sprocket chain 12 carries at intervals a series of blocks 28 each of which is rigidly connected to one of the links of the chain by means of pins 29 (Fig. 2 and Fig. 3). The blocks have lateral extensions at 30 adapted to engage undercut portions alongside the longitudinal slot in the table top, which slot is preferably formed in a metallic casting or series of metallic forms 31 providing a sort of trough extending lengthwise of the table into which are set bars 32. Longitudinally extending bars 33 somewhat wider at the top than at the bottom rest on the blocks 32 and thereby form a groove somewhat in the shape of an inverted T, it being understood that the specific method of providing a groove of this character is a mechanical detail subject to variation within wide limits. The lateral flanges 30 on the blocks act to guide them and prevent tilting and also to hold them rigidly in place to clamp in proper position the work, which may consist for example of such objects as table legs which are to be shaped and which may be shaped simultaneously to provide assembling features of construction as well as ornamental details of conformation.

At the top of each block in the working position of Figures 1 and 2 there are a pair of abutments 34 and 35, the abutment 34 being preferably fixed on the block by bolts or screws 34' (Fig. 3) and abutment 35 being slidably mounted in a guide on abutment 34 and another guide on a lug 35' which is here shown as integral with abutment 34. A transverse ridge 37' on abutment 34 engages in a slot of block 28 for securing the parts against relative movement. The abutment 35 is yieldingly held in projected position by a spring 36' so that a piece of work may be clamped against an abutment 34 at the left end of the device as shown in Figure 1 by the resilient action of spring 36', the piece of work being clamped between the two abutments as abutment 34 approaches abutment 35 in traveling about the sprocket 13, as will be understood from consideration of Figure 2. The work now being released from the feed (which may be manual or mechanical) will be held rigidly in place between the two abutments. This operation is facilitated by the fact that the rearmost block tilts as it passes up over the curved track 13 which makes it more convenient to apply the work with a downward and backward movement of the block until the forward end of the work is behind the abutment 35. The work will now be carried positively forward by the chain over the length of the table and will be released at the right end of the table by the tilting movement of the foremost of two adjacent blocks 28 so that the work can either fall automatically out of place or can readily be removed by a workman.

A track or guide 37 consisting of a single or double parallel rail is provided at the under side of the chain said track or guide extending from front to rear of the machine and being bent over at 38 to cover the sprocket 16 in part. This guide serves to prevent accidents and also provides a travel or guide on which the lateral flanges 30 ride during the travel of the chain underneath the table. Said track preferably has uneven or waved portions to jar dirt or shavings from the blocks during the travel. Furthermore the bent portions 38 help to guide the carrier blocks from the table into return position on the table.

As the work passes along the table it is acted on by operating devices of any desirable character, here illustrated as cutterheads of which one is indicated at 39, these cutterheads being preferably arranged in pairs at opposite sides of the groove in which the chain travels. The cutterheads are operated by means of upright shafts 40 driven by electric motors, 41, 41'. The bearings for the motor shaft are illustrated in Figure 3 said bearings comprising an upper roller bearing 42 and a lower roller bearing 43 arranged in any suitable manner for sustaining the thrust of the motor shaft. The bearings for the motor shaft are mounted on brackets or levers 44, 44' swingable about vertical pivots 45, the forward arm of each bracket having a semi-cylindrical groove at its forward end as indicated at 46 (Fig. 1) and the bearings being clamped in place by caps 47 bolted to the forward ends of said arms. As shown particularly in Figure 2 one of the arms 44, 44' is inclined in an upward direction and the other is inclined downward, the purpose being to provide a staggered arrangement of the driving motors for the cutter-heads. This enables the use of relatively large motors such as are needed to provide the power required to do the work of driving the cutterheads, the one motor overlapping the other as arms 44, 44' swing toward the work carried by the chain. The motor shafts project up through slots in casting 48 set into the top of the table. The pivots 45 are held in brackets secured to the legs 11 of the table and have shoulders near each end for sustaining the roller bearings by which the brackets 44 are movably supported.

The brackets 44, 44' have arms extending rearward of the pivots into operative relation with the cam 49, said arms being provided with followers 50 held in blocks 51 slidably mounted at the rear ends of the arms 44, 44' to provide for change in working position and stroke of the cutterheads. Screws 52 extend through arms on the slidable blocks 51 into threaded holds in the swingable arms 44, 44' for adjusting the position of the followers 50 after which the slidable blocks are fixed in place by means of screws 53 extending into threaded openings in the swingable arms. Any suitable means may be provided for keeping the followers 50 in contact with cam 49. For example a coiled spring may extend from one to the other of the rearwardly-extending arms with its ends secured to the respective arms, or a cable may be secured to one arm and pass over a pulley on the other, the free end of the cable having a weight attached thereto for pulling the arms toward each other.

The cam 49 is suitably shaped to swing the brackets 44 for moving the cutterheads toward and from the work as the same progresses along the table, and may assume a great variety of forms according to the work to be done. The cam is driven in synchronism with the rest of the machine by means of a shaft 54 (Fig. 3) vertically mounted in roller bearings, said shaft carrying at its upper end a bevel gear 55 meshing with a bevel gear 56, the latter gear being fixed to a shaft 57 (Fig. 4) carrying at its other end a sprocket 58 connected by a chain 59 (Fig. 1) to the sprocket 27.

It is thought that the operation of the machine will be understood from the foregoing. As the chain moves along, in the direction indicated by the arrows in Figures 1 and 2, a block of wood or other material to be shaped is laid on the blocks 28 in front of its fixed abutment 34 which contacts with the adjacent end of such block as it assumes a horizontal position and forces it forward against yielding abutment 35, said block being carried forward by the rigid abutment and yieldingly clamped by the yielding abutment under the pressure of the spring 36'. By this means the work is not only firmly held but slight variations in its length are provided for. The work is carried forward between the two cutterheads 39 which are moved in and out by the cam 49 according to the desired shape of the finished work, two opposite sides of the work being shaped at a single passage. It will be understood that only one of the heads may swing and the other may stand still and that one of the heads may be provided with cutting means while the other is smooth if desired. After the work passes the cutterheads it travels with the chain to the right end of the machine where the tilting movement of the block 28, as illustrated in Figure 2, acts to release the work from the clamping action of the abutments. It is to be understood that the operative run of the chain need not travel horizontally or in a straight line, but may travel in any direction.

While I have shown the machine as adapted for hand feeding it will be understood that automatic feeding means can be provided and that many other changes may be made without departing from the spirit of the invention, and therefore I do not limit myself to what is shown in the drawings and described in the specification but only as indicated in the appended claims. While the machine is described as intended for shaping wood it will be understood that it can be used substantially or entirely without modification on work of metal or any other material.

Having thus fully described my said invention what I claim as new and desire to secure by Letters Patent is:

1. A shaping device comprising a table having a longitudinal groove, an endless chain traveling in said groove below the surface of the table, spaced abutments on said chain extending above said surface for moving objects along the top of the table, means yieldably forcing one of said abutments toward the other, shaping means on the table for operating on said objects during their travel across the table, vertical pivots for the shaping means and means under the table for swinging the shaping means toward and from the path of the work during such travel, substantially as set forth.

2. The combination of a worktable, an endless chain of relatively short links having one run movable along the top of the table, guides for the chain at opposite ends of the table, elongated blocks each attached at one end to the chain and free at the other work clamping abutments on the blocks arranged to approach toward and recede from each other as the blocks tilt in passing said guides at opposite ends of the table and a track underneath the table engaging the free ends of said blocks, substantially as set forth.

3. In combination, a worktable, a conveyor chain, blocks on the chain, a trough on the table in which one run of the chain travels, work clamping means on the blocks, lateral projections on the blocks and slots in the sides of said trough cooperating with said lateral projections to prevent tilting of said blocks, substantially as set forth.

4. The combination of a worktable, a pair of brackets pivotally supported underneath the table for movement toward and from each other, electric motors on said brackets in axially staggered relation to each other, operating devices on the shafts of said motors opposite each other above the table, and means acting on said brackets for moving said operating devices toward and from each other, substantially as set forth.

5. The combination of a worktable, an endless chain of relatively short links having one run movable along the top of the table, guides for the chain at opposite ends of the table, elongated blocks each attached at one end to the chain and free at the other, work clamping abutments on the blocks arranged to approach toward and recede from each other as the blocks tilt in passing said guides at opposite ends of the table, and a track underneath the table engaging the free ends of said blocks said track being irregular for removing refuse from said blocks, substantially as set forth.

6. The combination of a worktable, an endless chain of relatively short links having one run movable along the top of the table, a sprocket at one end of the table driving said chain, guides for the chain at opposite ends of the table, elongated blocks each attached at one end to the chain and free at the other, work clamping abutments on the blocks arranged to approach toward and recede from each other as the blocks tilt in passing said guides at opposite ends of the table, and a track underneath the table engaging the free ends of said blocks said track extending up over said sprocket, substantially as set forth.

7. In a woodworking machine, a conveyor chain having relatively short links, blocks of greater length than said links fixed to certain of said links and extending back over others, parallel projections on said blocks, an abutment slidably supported on said projections and coacting with one of said projections on an adjacent block to clamp the work, and a spring between said projections said spring bearing at one end against a shoulder on said abutment for moving it toward clamping position, substantially as set forth.

8. In a woodworking machine, a conveyor chain having relatively short links, blocks of greater length than said links fixed to certain of said links and extending back over others, a fixed abutment on each block, and a yielding abutment on each block coacting with the fixed abutment on the next block to clamp the work in place, substantially as set forth.

9. In a woodworking machine, a conveyor chain having relatively short links, blocks of greater length than said links fixed to certain of said links and extending back over others, a rearwardly-facing fixed abutment on each block, and a forwardly-facing yieldable abutment on each block coacting with the fixed abutment on the next block to clamp the work in place, substantially as set forth.

10. In a woodworking machine, a conveyor chain having relatively short links, blocks of greater length than said links fixed to certain of said links and extending back over others, a rearwardly-facing fixed abutment on each block, and a forwardly-facing yieldable abutment on each block coacting with the fixed abutment to clamp the work in place said abutments being spaced from the ends of the blocks to permit the work to rest thereon, substantially as set forth.

In witness whereof, I have hereunto set my hand and seal at Indianapolis, Indiana this 9th day of December, A. D. nineteen hundred and twenty-four.

PAUL KLIEBER. [L. S.]